RECORDING MAGNITUDES IN RATIO FORM

Filed Nov. 29, 1949 6 Sheets-Sheet 1

Inventors
William O. Gates
Robert R. Perron
By their Attorney

RECORDING MAGNITUDES IN RATIO FORM

Filed Nov. 29, 1949 6 Sheets-Sheet 2

Inventors
William O. Gates
Robert R. Perron
By their Attorney

Oct. 25, 1955 W. O. GATES ET AL 2,721,989

RECORDING MAGNITUDES IN RATIO FORM

Filed Nov. 29, 1949 6 Sheets-Sheet 3

Inventors
William O. Gates
Robert R. Perron
By their Attorney

RECORDING MAGNITUDES IN RATIO FORM

Filed Nov. 29, 1949

Inventors
William O. Gates
Robert R. Perron
By their Attorney

Oct. 25, 1955 W. O. GATES ET AL 2,721,989

RECORDING MAGNITUDES IN RATIO FORM

Filed Nov. 29, 1949 6 Sheets-Sheet 5

Inventors
William O. Gates
Robert R. Perron
By their Attorney

Oct. 25, 1955 W. O. GATES ET AL 2,721,989

RECORDING MAGNITUDES IN RATIO FORM

Filed Nov. 29, 1949 6 Sheets-Sheet 6

Inventors
William O. Gates
Robert R. Perron
By their Attorney

United States Patent Office 2,721,989
Patented Oct. 25, 1955

2,721,989

RECORDING MAGNITUDES IN RATIO FORM

William O. Gates and Robert R. Perron, Beverly, Mass., assignors to United Shoe Machinery Corporation, Flemington, N. J., a corporation of New Jersey Application November 29, 1949, Serial No. 130,022
7 Claims. (Cl. 340—174)

This invention relates to improvements in apparatus for recording and reproducing magnitudes and is illustrated as embodied in apparatus for magnetically recording a two-dimensional contour in terms of the position of a tool or tracer in following the periphery of a contour pattern while the pattern is rotated, and for controlling, from the record so prepared, the position of a tracing tool to reproduce the said contour upon a rotated workpiece. It is to be understood that in its more general aspects, the invention is not limited to use in machines of that particular character.

It has, of course, long been known to control movements in an operating cycle of a machine by using cams as memory devices to position or move mechanisms or work through predetermined paths, the cams "remembering" positions, or magnitudes of displacement, in relation to the machine cycle. However, the use of cams imposes limitations on the flexibility of machines where frequent changes of the tool cycle are desirable. This, for example, is the case in automatic shoe machinery where a large number of different shoe styles are encountered. It is not convenient in such cases to store sufficient metallic cams to accommodate the necessary styles, and, since cams are relatively expensive, the employment of numerous cams is costly.

Proposed photoelectric controls using templates scanned by phototubes suffer similar disadvantages, although to a lesser degree and may in addition suffer from physical distortion of the templates during storage or use. Other systems for recording movements, employing, for example, wax records or punched sheets may either fail to have the desired accuracy or are sensitive to changes in speed of reproduction, whereby if the rate of movement of the record is changed the tool may not follow its proper path.

Accordingly, an object of the invention is the provision of improved apparatus for recording the magnitude of a variable, or of two or more related variables, and for reproducing such magnitudes from a record thereof, such apparatus being, for example, adapted for automatic control of machinery.

To this end and in accordance with a feature of the invention, apparatus is provided for recording and reproducing magnitudes in a system called ratio modulation.

In the illustrative apparatus embodying the invention, the magnitude of a variable is recorded by treating magnetically each of successive adjacent portions of the recording path of a recording medium to render distinguishable therein a sub-portion and a remainder, the length-ratio of the sub-portion to its portion being determined by the magnitude of the variable to be recorded. Where the magnitude of a first variable is to be recorded in relation to the magnitude of a second variable, for example, time, the magnitude of the second variable is recorded as a function of the position of a portion along the recording medium, while the related magnitude of the first variable is recorded in length-ratio on said portion.

In the illustrative apparatus, to provide such treatment, a recording path of a recording medium, such as a magnetizable tape or wire, is progressively moved relative to a recording head and is thereby periodically subjected to a magnetic flux of a given polarity for an interval whose time ratio to the period interval is modulated in accordance with the magnitude of the variable to be recorded, thereby to render a sub-portion of each portion of the path traversing the said zone during a period interval distinguishable from the remainder of the portion by reason of the direction of the flux alinements thereon.

This "time-ratio" modulation accordingly appears on the recording medium as the length-ratio of a sub-portion to the portion of which it forms a part. Since the intelligence is recorded as a length-ratio rather than as a dimension, and since this length-ratio is not affected by conditions causing proportional changes in the length of sub-portions and portions, for example, shrinkage of the recording medium or variations in the speed of the medium in recording, such shrinkage or variations do not adversely affect the accuracy of the system. Also, when this ratio modulation is used, the effect of changes in speed of reproduction or in the amplitude or intensity of the signal by which sub-portions and remainders are rendered distinguishable in recording, or by which they are distinguishable in the record, is minimized.

To the end of reproducing a time-ratio modulation record, the illustrative apparatus comprises means controlled by a reproducing head for generating a square voltage wave having upper and lower loops corresponding in length with the flux pattern of the record, and means for deriving from the square voltage wave a voltage which varies as a function of the relative lengths of the upper and lower loops.

These and other features and advantages of the invention will best be understood from a consideration of the following specification taken in connection with the accompanying drawings in which, Fig. 1 is a plan view of a portion of a machine embodying one form of the invention for recording and reproducing the movement of a tool in operating upon the periphery of an object during rotation thereof;

Figure 1:
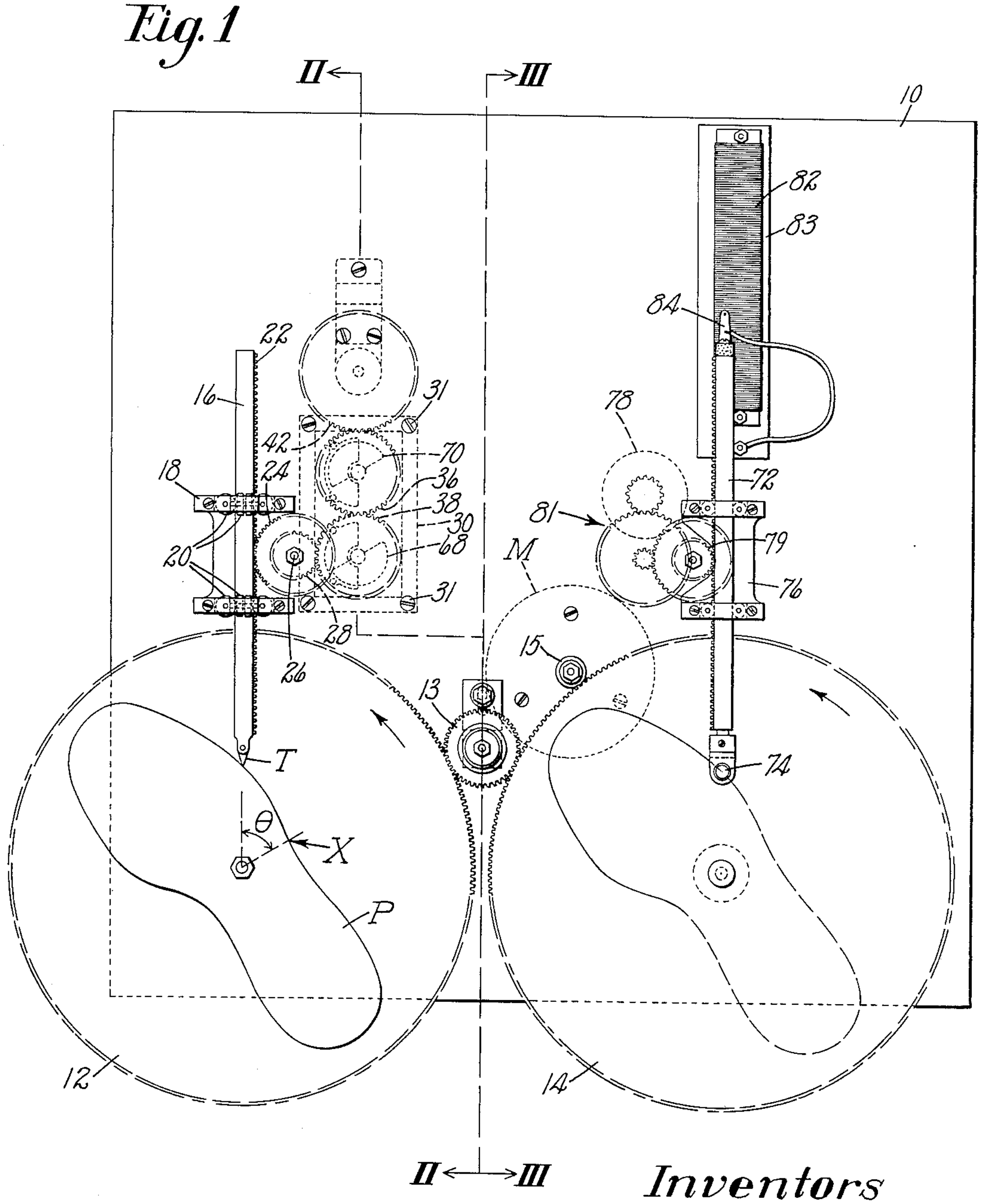

Referring to Fig. 1, the illustrative machine comprises a frame 10 on which are supported a rotatable pattern support 12 and a rotatable workpiece support 14. Each support is provided with gear teeth along its periphery to engage a pinion 13 and the two supports are thus arranged to be rotated in unison by a synchronous motor M having a friction pulley 15 engaging the periphery of the support 14.

As a pattern P on the support 12 is thus rotated, it will be seen that, as viewed along a fixed radius, the periphery of the pattern will have apparent movement inwardly and outwardly of the center of the support. Further, it will be seen that a history of the movement of a periphery-engaging member, or, more abstractly, of the magnitude of a contour-defining dimension, for example, the distance of the periphery from the center of the support along a fixed radius, as related to the position of the pattern during one rotation, will provide a record of the contour of the pattern.

Figure 2:
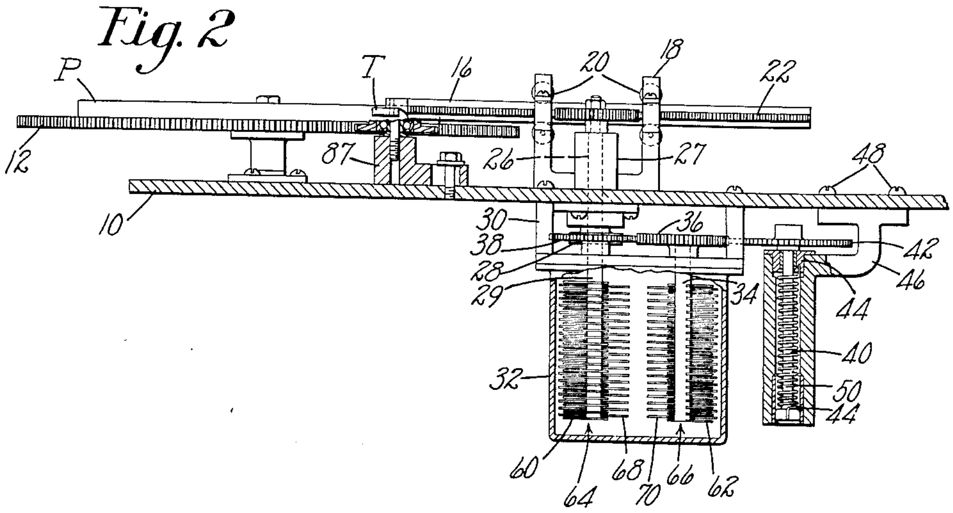
Fig. 2 is a view partly in section along line II—II of Fig. 1 showing certain details of a portion of the machine concerned with recording such movement.

To provide means for following the periphery of the pattern P on the support 12 as it is rotated and for measuring the distance of the periphery from the center along a fixed radius, an arm 16, carrying at one end a tracer T adapted to engage the periphery of the pattern, is supported for radial movement toward and away from the center of support 12 by a bracket 18 attached to the frame 10. The bracket 18 has alined apertures formed by anti-friction rollers 20 which allow free movement of the arm 16 only in said directions. Teeth 22 on one side of the arm 16 engage a gear 24 attached to a shaft 26 extending downwardly through a bearing 27 (Fig. 2) in the top of the frame, and having at its lower end a gear 28. A shaft 29 extends through a bracket 30 and into a compartment 32. Adjacent to this shaft, another shaft 34 extends downwardly through the bracket 30 into the compartment 32. A gear 36 attached to the upper end of the shaft 34 engages a gear 38 attached to the shaft 29 which gear in turn engages gear 28 so that the two shafts rotate in opposite directions during movement of the arm. The gear 36 is yieldingly urged to rotate in a direction to move the arm 16 inwardly. For this purpose, a shaft 40, carrying at its upper end a gear 42 engaging the gear 36, is supported by bearings 44 in a bracket 46 attached to the frame 10 by screws 48 and is urged to rotate by a coil spring 50 surrounding the shaft 40 within the bracket. The spring 50 is anchored at its upper end to the bracket while its lower end is attached to the enlarged lower end of the shaft 40 adjacent to its periphery.

In order to adjust the relative conduction periods of the two stages of a multivibrator, hereinafter further described, in accordance with the position of the arm 16, the movable plates 60, 62 of variable condensers 64, 66 mounted within the compartment 32 and having stationary plates 68, 70 are arranged by attachment respectively to the shafts 29, 34 to rotate with the shafts in opposite directions to vary oppositely the capacity of the two variable condensers.

Accordingly, as the support 12 is rotated, the arm 16 will be moved either outwardly by the pressure of the periphery of the pattern against the tracer T or inwardly by the bias provided by the spring 50, and as it moves inwardly and outwardly, the variable condensers 64 and 66 will be oppositely varied in accordance with the distance of the tracer T from the center of the support 12.

Figure 3:
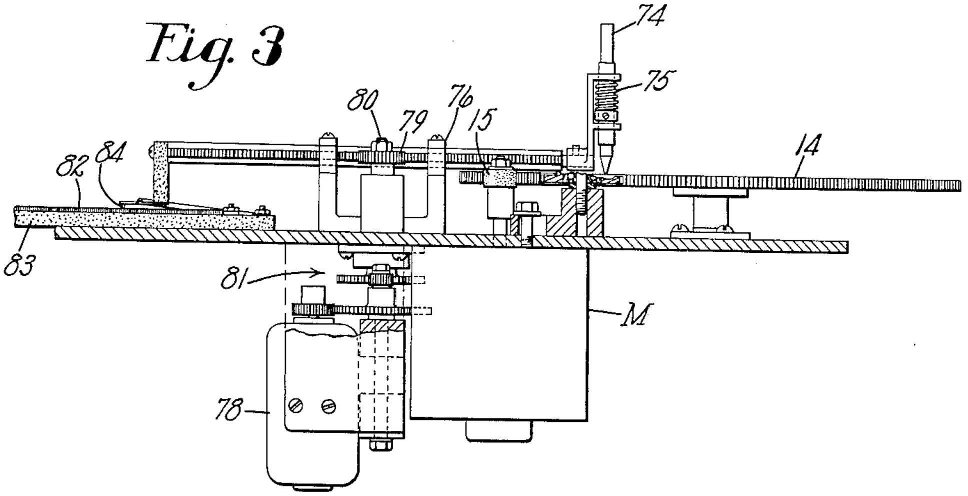
Fig. 3 is a view partly in section along line III—III of Fig. 1 showing certain details of a portion of the machine concerned with reproducing such movement.

In the reproducing elements of the machine shown in Figs. 1 and 3, an arm 72 carrying at one end a stylus 74 downwardly biased by a spring 75 is mounted in a bracket 76, similar to the bracket 18, to provide movement of the stylus 74 toward and from the center of the workpiece support 14. The arm 72 is arranged to be driven inwardly and outwardly of the support 14 by a servomotor 78 to which it is connected by a gear 79 engaging teeth on the side of the arm, a shaft 80 and a train of gears 81 engaging a gear on the motor shaft. The motor 78 is connected, as will be described later, to a servo amplifier so that the motor drives the arm 72 in one direction or the other responsively to a control voltage derived from a recorded tape to cause the stylus 74 to follow the movement recorded on the tape. The follow-up portion of the servo loop comprises a potentiometer formed by a resistance card 82 secured to the frame on an insulating slab 83 over which a contact 84 attached to the other end of the arm 72 and insulated therefrom is adapted to travel.

Figure 4:
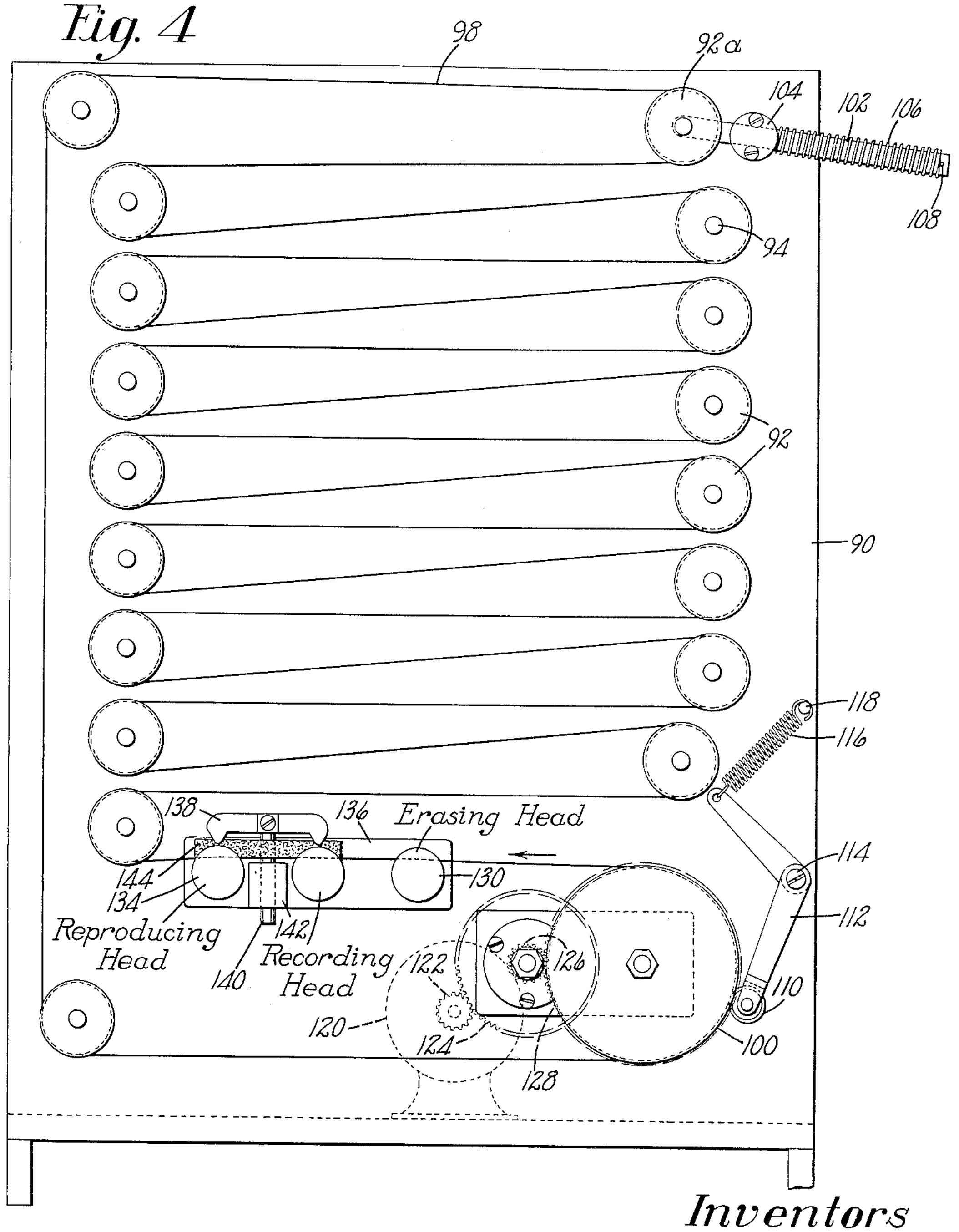
Fig. 4 is a front elevation of a portion of the machine concerned with supporting and moving a recording medium and for recording thereon and reproducing therefrom.

In Fig. 4 there is shown a part of the system which is mounted on a panel 90 shown as mounted upright. On this panel a series of flanged pulleys 92, rotatably supported on shafts 94 in the panel, provide a support for a recording tape 98 which is threaded over these pulleys and over a drive wheel 100 to form an endless belt. One, 92*a*, of the pulleys is movably mounted on the panel on a rod 102 extending through an aperture in a bracket 104 mounted on the panel. The rod is biased by a surrounding spring 106 between the bracket 104 and a pin 108 to move the pulley 92*a* in a direction to take up any slack in the tape. To prevent slippage at the drive wheel 100, a roller 110 mounted at one end of a bell crank 112 pivotally mounted on the panel 90 by a screw 114 is urged against the periphery of the drive wheel 100 by a tension spring 116 fastened between the other end of a bell crank 112 and a pin 118 fixed in the said panel. Movement of the tape is provided by a synchronous motor 120 which operates the drive wheel 100 through a train of gears 122, 124 and 126 and a gear 128 attached to the shaft of the drive wheel. By this means, the tape is made to move past an erasing head 130, a recording head 132, and a reproducing head 134, so that the tape traverses the operating zones of the respective heads. These heads are each mounted on a bracket 136 attached to the panel and are disposed to provide alinement of the heads with the path of movement of the tape. To insure that the tape will traverse the operating zones of the heads, a slight downward pressure upon the tape as it passes over the heads is provided by the ends of a gravity pressure member 138 attached to a rod 140 vertically slidable in an aperture in a bearing block 142 attached to the bracket 136. The ends of the member 138 are thus gravity-urged downwardly to engage a felt 144 and to hold the tape in the desired position.

While the particular arrangement of the pulleys described above provides a convenient support for a closed loop record, it will be appreciated that other arrangements for supporting and moving the tape past the various heads can also be employed. For example, the tape may be unreeled from one drum and taken up on a second drum in a well-known manner.

Figures 5, 6:
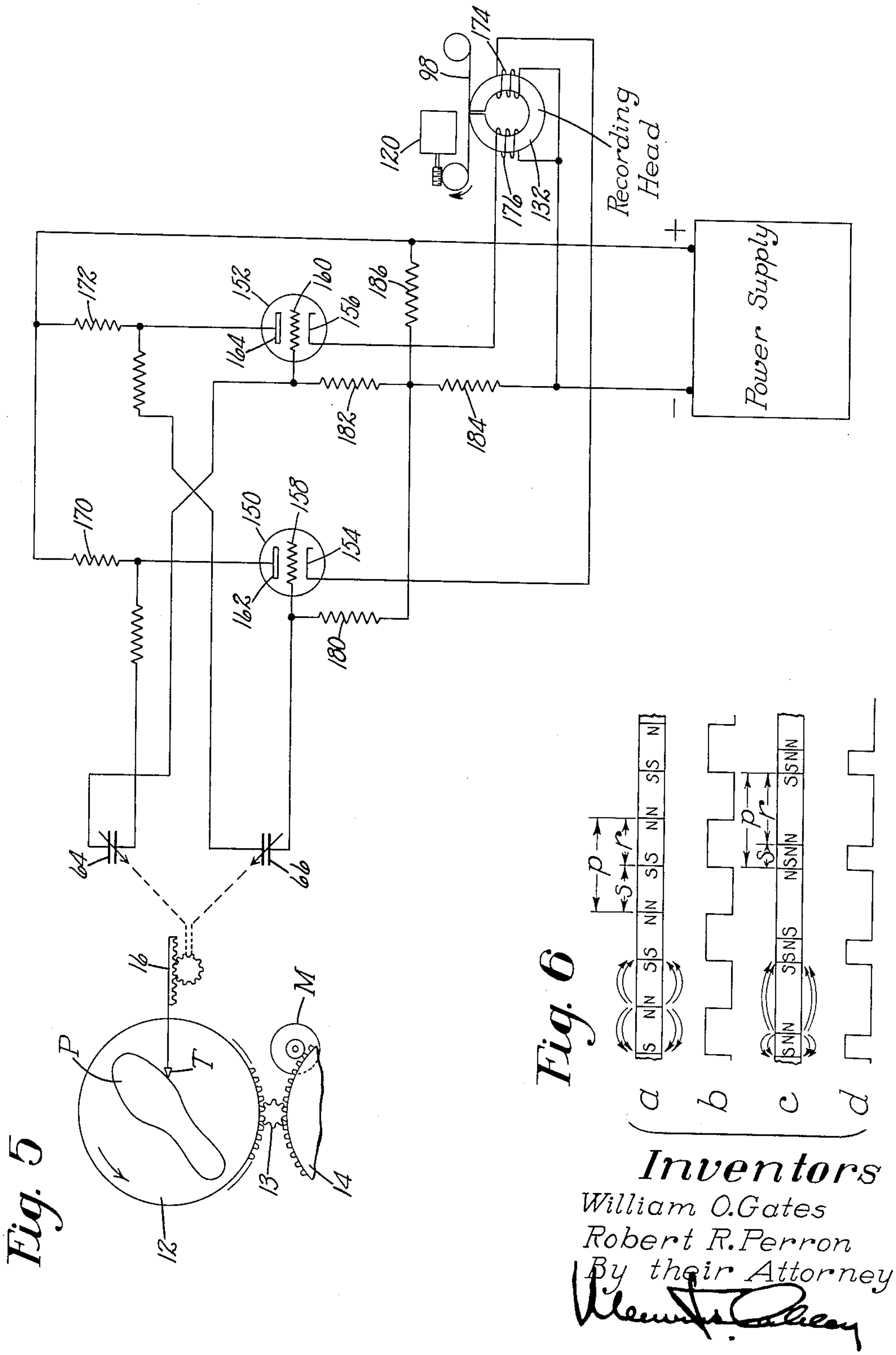
Fig. 5 is a diagram of the electric circuits employed in recording by the illustrative machine.
Fig. 6 is a diagram representing portions of a magnetizable tape treated in accordance with the invention and wave forms of the corresponding flux recorded on the tape.

Fig. 5 illustrates a multivibrator circuit which is employed to energize the recording head in alternate polarities in a time-ratio the magnitude of which is determined by the distance of the tracer T from the center of the support 12. The multivibrator comprises two vacuum tubes 150, 152 having respectively cathodes 154, 156, grids 158, 160 and anodes 162, 164. The tubes 150 and 152 comprise a two-stage resistance-capacitance coupled amplifier wherein the output of tube 150 is connected through the variable condenser 64 to the input of tube 152 and the output of tube 152 is connected through the variable condenser 66 to the input of tube 150. The anodes of the tubes 150, 152 are energized from a power supply through the load resistances 170, 172 respectively. Cathode 154 is connected to one end of a winding 174 on the recording head 132 while cathode 156 is connected to one end of another winding 176 on the head 132. The other ends of the windings 174 and 176 are connected together and to the negative terminal of the power supply, the arrangement being such that the recording head 132 is energized in one polarity or the other depending upon which one of the tubes 150, 152 is conducting. Grid resistors 180 and 182 provide a leakage path from the grids 158 and 160 respectively and an appropriate bias therefor by connection to the junction of resistors 184 and 186 series-connected across the power supply. Accordingly, there is provided a multivibrator whose frequency is primarily determined by the time constant of condenser 66 and resistor 180 and the time constant of condenser 64 and resistor 182. Since the resistance of the resistors 180 and 182 is fixed, the conducting time of these tubes is determined by the setting of the condensers 64 and 66. Further, since these condensers are arranged to be oppositely varied, the ratio of the semi-cycle period, that is, the conducting time of either of the tubes to the cycle period varies with the setting of the condensers while, because the total capacitance of these condensers remains constant, the multi-vibrator cycle period, and hence its frequency, remain constant.

It will be seen therefore that the multivibrator generates a single signal comprising a train of periodic waves, each wave having two distinctive subportions, respectively positive and negative, the beginning and ending of such sub-portions being identified by predetermined time-spaced wave variations of two different types. Both types of variations are characterized by an abrupt change in the rate of change of the multivibrator output voltage, also by an abrupt change of the output voltage. In one type the voltage changes abruptly to a higher value, and in the other type it changes abruptly to a lower value. It will also be seen that the duration of the positive sub-portions of the square waves is modulated as a predetermined function of the distance of the tracer T from the center of the support. Since the multivibrator period is constant, this results in modulating the time-ratio of wave sub-portion to period.

It is, of course, not necessary to vary both condensers to achieve time-ratio modulation, but we have found advantageous the linearity provided by such opposite change in capacitances.

Instead of the illustrated condenser arrangement, the multivibrator cycle portions may be oppositely varied by other known procedures. For example, variable resistors may be employed with fixed condensers, or a variable bias voltage may be applied to the grid of one of the tubes in place of the fixed bias. In the latter case, the time-ratio of cycle portions will vary with the magnitude of the bias voltage which may, for example, be derived from a potentiometer actuated by a mechanism whose position is to be recorded.

While the choice of multivibrator frequency will depend among other things on the frequency of the response desired and upon the frequency characteristics of the tape, we have found that a frequency of about 180 cycles per second is satisfactory.

To understand the operation of the recording apparatus and the nature and advantages of the record produced by the invention, let us assume that, for a certain position of the tracer T, say that shown in Fig. 1, the condensers 64, 66 will be so adjusted that the conduction periods of the two stages of the multivibrator will be substantially equal and currents will flow through the recording head in a manner depicted in Fig. 6(*b*), indicating that the current flows for equal periods in alternate coils of the recording head. Fig. 6(*a*) depicts with a greatly exaggerated longitudinal dimension the resulting magnetization of a magnetizable tape moved through the operating zone of the recording head at a uniform speed. It is seen that the tape is longitudinally magnetized first in one polarity and then in the other polarity and that each portion *p* of the tape treated by the recording head during one cycle of the multivibrator is equal in length to other such portions while a unitary sub-portion *s* of each portion, distinguishable by its polarity from the remainder *r* of the portion, bears a fixed ratio of its length to the length of the portion of which it forms a part.

Also, looking along the tape as it might traverse the operating zone of a reproducing head, it will be seen that at the junctions of sub-portions and remainders there is an abrupt change in the rate of change of flux, which rate of change is elsewhere uniform, and that there are two types of abrupt changes, one of which identifies the beginning of a sub-portion by a polarity change in one direction while the other identifies the beginning of a remainder by a polarity change in the opposite direction. Since the output voltage of a reproducing head for a magnetic tape is a function of the rate of change of tape flux, it will be seen that the aforesaid abrupt changes may be made to produce abrupt changes in the output voltage adapted to render distinguishable sub-portions and remainders. That is to say that the two types of flux changes may be made to produce two different types of abrupt changes in the output voltage of the reproducing head, which makes it possible to distinguish between sub-portions and remainders since the sub-portions follow one type of change and remainders follow the other type of change.

Now assume that in Fig. 1 the support 12 has been rotated through an angle $\theta$ to present another point X on the periphery of the pattern P to the tracer T and that the latter has been moved inwardly, say half way from its first position to the center of the support 12, by the hereinbefore described spring 50 to engage the said periphery at point X.

The new position of the tracer T will correspond with a new position of the condenser shafts 26 and 34 and accordingly the capacitance of the condensers 64 and 66 will have been differentially varied to produce a multivibrator cycle depicted by Fig. 6 (*d*) wherein the conduction period of one stage is one-quarter of a cycle period while the conduction period of the other stage is three-quarters of a cycle period. Accordingly, while the length of the portions of the tape corresponding to one cycle remains unchanged, the ratio of the length of each sub-portion *s* to the length of the portions *p* is now one to four, as depicted in Fig. 6 (*c*) and (*d*).

During recording, the support 12 is rotated at a predetermined angular velocity by the motor M, and the recording tape is driven at a predetermined velocity by the motor 120 whereby the movement of the tape is synchronized with the movement of the support. Accordingly, the tape will be progressively treated to provide adjacent portions, each representing by its position on the tape a predetermined magnitude of angular rotation of the support, and each representing, by the length-ratio of a distinguishable sub-portion thereof to the whole portion, a magnitude defining the position of the tracer T at the angular rotation of the support identified by the position of the portion on the length of tape.

Preferably, and as shown, the aforesaid time or length ratio bears a fixed proportionality to the magnitude of the displacement of the tracer tool T from the center of the work support 12. However, if desired, the ratio may be a nonlinear representation of magnitude. In such a case the reproducing apparatus may have a compensating nonlinearity of response which may be accomplished, for example, by making the resistance of card 82 nonlinear.

Figures 7, 8:
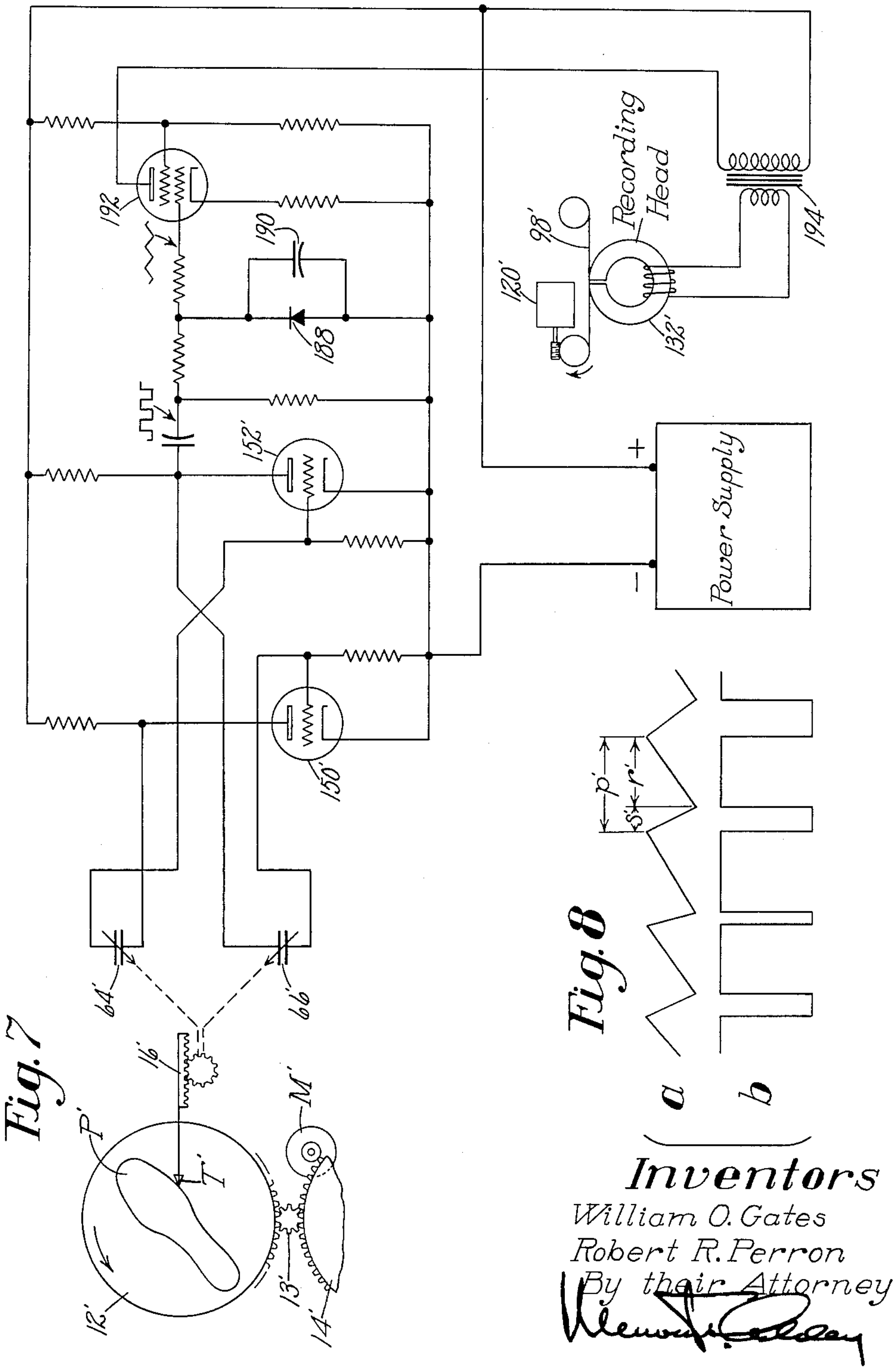
Fig. 7 is a circuit diagram of a modified recording machine.
Fig. 8 illustrates wave forms used to describe the operation of the modified machine.

It is, of course, possible to magnetize the tape in other ways to distinguish sub-portions from remainders. For example, the sub-portions may be magnetized as before, and the remainders left unmagnetized, or vice versa. Further the tape may be magnetized with a flux having a triangular wave form as by the modified arrangement illustrated in Fig. 7 wherein elements similar to those shown in Fig. 5 are indicated by prime reference numerals. In Fig. 7, the output of the multivibrator comprising the tubes 150' and 152' is coupled to the grid of an amplifying tube 192 through a network comprising a clamping rectifier 188 and an integrating condenser 190 whereby the square wave of output voltage from the multivibrator is changed to a triangular wave as indicated. The output of the tube 192 is coupled by a transformer 194 to a coil on the recording head 132'.

The resulting flux induced in the tape is indicated in Fig. 8 (*a*) which illustrates the wave forms of portions representing several different magnitudes, one portion *p'* having its sub-portion *s'* and remainder *r'* designated for comparison with Fig. 6 (*b*) and (*d*). It will be observed that this triangular flux also provides at the junction of sub-portions and remainders an identifying abrupt change in the rate of change of tape flux which rate of change is elsewhere uniform throughout a sub-portion or remainder.

However, we prefer to use the method wherein the tape is magnetized to saturation in alternate polarities since thereby any previous flux is swamped out and the need for erasure of past magnetic history is obviated.

Figure 9:
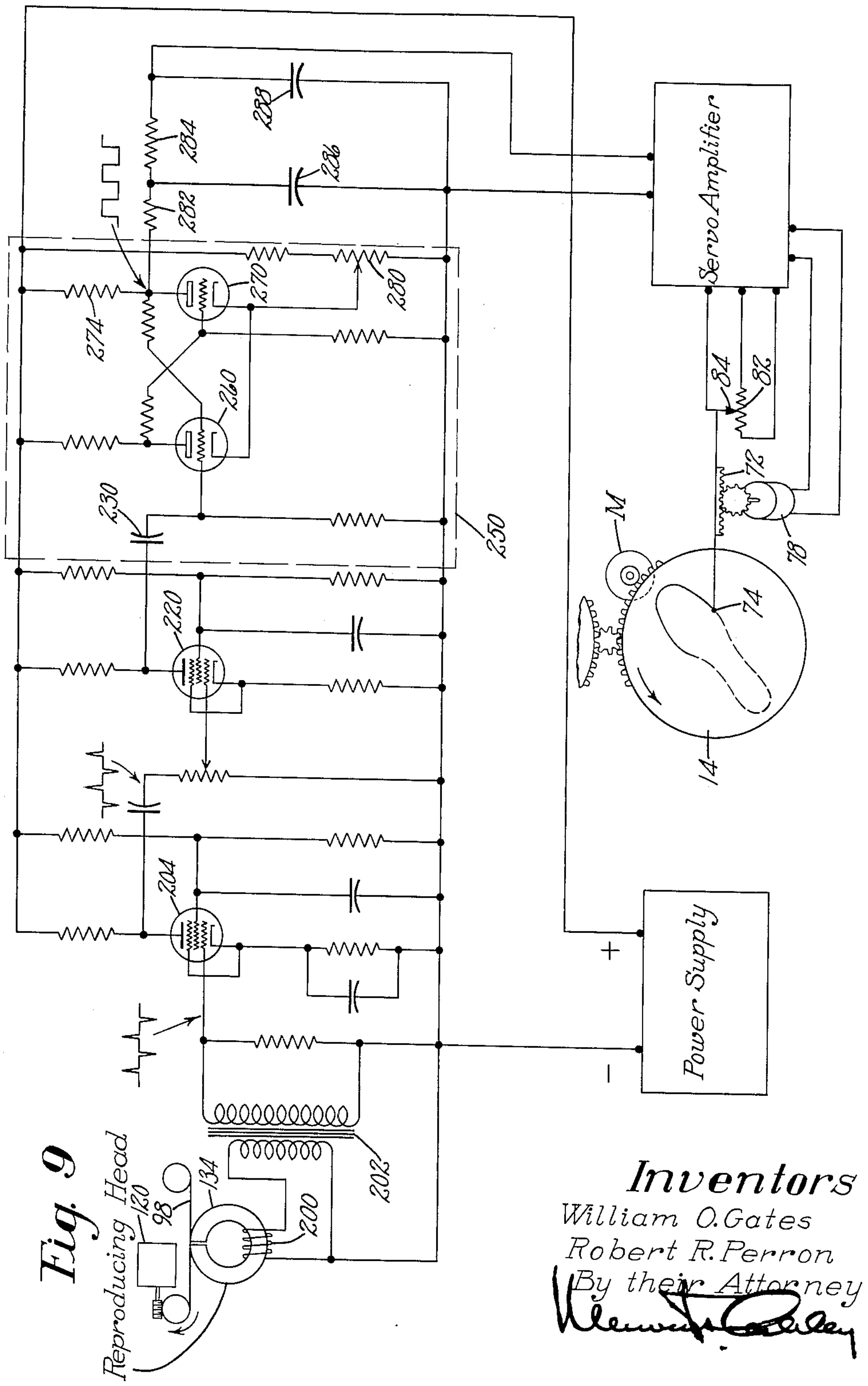
Fig. 9 is a diagram of the electric circuits employed in reproducing a magnetic record by the illustrative machine.

The apparatus diagramed in Fig. 9 is adapted for reproducing intelligence from a tape magnetized with a square-peaked flux in one or both polarities.

In this apparatus, a recorded tape 98 is caused to traverse the operating zone of the reproducing head 134 (Fig. 4) in synchronism with the rotation of the work support 14 when the synchronous motors M and 120 are energized.

The reproducing head 134 has a coil 200 in which there is generated during passage of the tape a voltage proportional to the rate of change of magnetic flux in the tape. Accordingly, during the passage of a junction of a sub-portion and remainder, whereat the flux in the tape goes rapidly from one level to another, a voltage peak is induced in the coil of a polarity depending upon the direction of flux change. The voltage impulses are fed through an input transformer 202 to the grid of an amplifier tube 204 which may conveniently be a pentode as illustrated. The amplified impulses, now reversed in phase, are passed to the grid of a second amplifier tube 220 whence, further amplified and restored to their original phase, they pass through a condenser 230 to a flip-flop circuit 250 comprising the cross-connected tubes 260 and 270.

This circuit is a well-known trigger circuit possessing two conditions of stable equilibrium; one condition is when tube 260 is conducting and tube 270 is cut off; the other is when tube 270 is conducting and tube 260 is cut off. The impulses applied to the grid of tube 260 trigger the circuit alternately from one condition to another. When tube 270 is not conducting, its anode is at the potential of the positive lead from the power supply, while when this tube is conducting, its anode is at a lower potential bacause of the voltage drop in its load resistance 274. The output of the flip-flop circuit, which output is this anode voltage, is thus in the form of a square-peaked voltage wave which is time-ratio modulated in accordance with the length-ratio modulation on the tape.

An important feature of the invention is the phase-sensitive response of the trigger circuit, so that, for example, a positive impulse effects a change in condition only if tube 270 is conducting and tube 260 is not conducting. Hence the time-ratio modulation of output voltage cannot become reversed and is therefore a faithful reproduction of the length-ratio modulation in the tape.

It will be seen that the average value of the output voltage of the flip-flop circuit is determined by the time-ratio of the peaks of the square wave, and that the average value will thus vary in accordance with the magnitude represented by the length-ratio modulation on the tape.

To derive the average value of the square wave of voltage, the output of the flip-flop circuit is conducted to a smoothing filter, comprising the resistors 282 and 284 and the condensers 286 and 288, by connection of the anode of tube 270 to resistor 282.

The resulting D. C. voltage is conducted to a servo amplifier and motor 78, which may be conventional, to move the arm 72 to a position determined by the magnitude of the average value of the square wave of output voltage.

Where the tape has been magnetized with triangular flux, as by the circuit shown in Fig. 7, the output of the reproducing head will be in the form of a square-peaked voltage wave because of the two different uniform rates of change of flux progressively along respectively each sub-portion and remainder of the portions of the tape. The length of each peak will coincide with the time required for the sub-portion or remainder to pass the operating zone of the recording head, and hence the peaks will have a time-ratio modulation corresponding to the ratio of the lengths of sub-portions and remainders.

Since, however, the amplitudes of the peaks may vary with variations in the slopes of the flux triangles (see Fig. 8(*a*)), it is necessary to clip the peaks at predetermined maximum and minimum potentials before deriving their average voltage.

Accordingly, a conventional limting circuit may be substituted for the flip-flop circuit in the circuit shown in Fig. 9 to provide a circuit for reproducing intelligence from a triangular-flux-type tape. The output from the limiting circuit to the smoothing filter is represented by the square voltage wave shown in Fig. 8(*b*).

In operation, a pattern having a contour to be recorded is mounted on the support 12 and a magnetizable tape is mounted on the pulleys 92 as shown in Fig. 4. If desired, the tape and the support may be marked to identify their respective starting positions. After the recording circuits have been allowed to "warm up," the motors M and 120 are energized so that the tape traverses the operating zone of the recording head 132 in synchronism with the rotation of the support. After one complete revolution of the support, the recording operation may be suspended, and the record of the contour may be removed and stored, or left on the pulleys for reproduction. In the latter case, while the reproducing circuits are allowed to warm up, a sheet of paper or other workpiece may be secured to the work support 14. The synchronous motors are then energized, and as the recorded portions of the tape traverse the operating zone of the reproducing head and the support 14 rotates, the stylus 74 will trace the recorded contour upon the paper. If desired, the stylus may be replaced, for example, by a cutting tool so that when a leather blank is secured to the support 14, the tool will be controlled by the reproducing apparatus to cut out the desired shape, for example, an insole. In operating the illustrative device to trace a contour on a blank sheet, it is not necessary to coordinate a particular position of the work support 14 with a particular point on the tape. However, such coordination will be necessary in certain cases, for example, where the tape is used to control a tool for working upon an object at predetermined locations. Inasmuch as the intelligence on the tape is in the form of a length-ratio, it will be seen that the speed of the tape together with the speed of the work support may be varied if desired without affecting the result.

Further, shrinkage of the tape in storage will not affect the ratio, but where shrinkage may occur it may be desirable to employ a sprocket type of tape drive to insure that the position of the tape corresponds to the proper position of the work support.

In the illustrative device, the movements of the tools are combined with rotary movements of the object and the workpiece to record and reproduce a two-dimensional contour exemplified by that of a shoe sole or insole. It is readily appreciated, however, that the same contour could be recorded and reproduced in terms of the position of the tools as a function of a different movement of the pattern and workpiece so long as the movements of the pattern and the workpiece are the same. For example, a two-dimensional contour may be recorded where the movements of the contour pattern and the workpiece are in translation. Also it will be seen that a three-dimensional contour may be recorded, for example, in the form of the position of a tool as a function of combined work support movements of rotation and axial translation, thus providing, in effect, a spiral scanning path. Alternatively, a plurality of synchronized recording paths may be used to control a plurality of such movements.

It will be apparent to those skilled in the art that other recording media, for example, a photographic film, may be subjected to appropriate treatment to provide a record having adjacent portions length-ratio modulated in accordance with a condition to be recorded. Also it will be understood that the invention is applicable to many other uses than the particular ones described herein.

Since certain changes may be made in the illustrative construction and different embodiments of the invention could be made without departing from the scope thereof, it is intended that all matter contained in the description or shown in the accompanying drawings shall be interpretated as illustrative and not in a limiting sense.

It is also to be understood that the following claims are intended to be given their broadest interpretation consistent with the scope of the invention.

Having described our invention, what we claim as new and desire to secure by Letters Patent of the United States is:

1. In apparatus adapted for recording on a moving magnetic recording path in time ratio modulation the value of a variable, a recording head having a flux gap adapted to cooperate with said path, means for energizing said head to establish a magnetic flux across said flux gap, said flux being alternately of opposite polarities, and means controlling said energizing means and adjustable to vary the period during which the flux is in one of said polarities in accordance with the value of a variable to be recorded.

2. In apparatus adapted for recording on a moving magnetic recording path in time ratio modulation the value of a variable, a recording head adapted to cooperate with said path, a two-stage multivibrator connected to said head to energize it in one polarity when one stage of said multivibrator is conducting and in the other polarity when the other stage of said multivibrator is conducting, and means in the multivibrator circuit adjustable to vary the conduction time period of one of said stages in accordance with the value of a variable to be recorded.

3. In apparatus adapted for recording on a moving magnetic recording path in time ratio modulation the value of a variable, a recording head adapted to cooperate with said path, a two-stage multivibrator connected to said head to energize it in one polarity when one stage of said multivibrator is conducting and in the other polarity when the other stage of said multivibrator is conducting, and control means for said multivibrator operable in accordance with the value of a variable to be recorded for varying diffrentially the conduction period of the two stages.

4. A device for converting alternately directed magnetic flux alinements on a moving magnetic memory path into an equivalent electrical signal having corresponding alternate first and second voltage levels, said device comprising a reproducing head adapted to be positioned adjacent to the magnetic memory path and responsive to each change of magnetic flux direction for producing output pulses, each of said pulses being of either a first or second polarity, amplifier means coupled to said head for amplifying said pulses, an electronic switching device operable by pulses of alternate polarity for triggering into first and second conduction states, and means for coupling the pulses from said amplifier to said switching device.

5. A device for converting time ratio modulation comprising alternately directed magnetic flux alinements on a moving magnetic memory path into an electrical voltage representing the value of a variable represented by said modulation comprising a reproducing head adapted to be positioned adjacent to the magnetic memory path and responsive to each change of magnetic flux direction for producing output pulses, each of said pulses being either of a first or second polarity, amplifier means coupled to said head for amplifying said pulses, an electronic switching device operable by pulses of alternate polarity for triggering into first and second conduction states, means for coupling the pulses from said amplifier to said switching device whereby said switching device is operated to provide a square wave electrical signal having alternate first and second voltage levels equivalent to the flux alinements on said path, and means for deriving a voltage which varies as a function of the relative lengths of the upper and lower loops of the square wave.

6. A device for converting a magnetic record of the value of a variable recorded in time ratio modulation into an electrical voltage representing said value, said record comprising alternately directed magnetic flux alinements on a moving magnetic memory path, said device comprising means including a reproducing head positioned adjacent to the magnetic memory path and responsive to the passage of said pattern past said head to generate a square wave of voltage varying between predetermined voltage levels corresponding to the changes in the direction of the flux in said path, and means for deriving a voltage which varies as a function of the relative lengths of the upper and lower loops of the square wave.

7. A device for recording the value of a variable quantity on a moving magnetic memory path in time ratio modulation comprising alternately directed magnetic flux alinements on said path, and for converting the resulting magnetic pattern back into a voltage proportional to said variable, comprising a recording head adapted to cooperate with said magnetic memory path, energizing means connected to said head and operable to magnetize said head alternately in opposite polarities, controlling means for said energizing means operable in accordance with the value of a variable to be recorded to vary the proportion of time during which the head is magnetized in a given polarity, a reproducing head, an amplifier coupled to said reproducing head for amplifying pulses induced therein by flux changes along the path, an electronic switching device coupled to said amplifier and operable by electric voltage pulses therefrom for triggering into first and second conduction states to generate an electric square wave voltage corresponding to the flux pattern passing the reproducing head, and means connected to said switching device for deriving a voltage which varies as a function of the relative lengths of the upper and lower loops of the square wave.

References Cited in the file of this patent

UNITED STATES PATENTS

| | | |
|---|---|---|
| 318,539 | Breach | May 26, 1885 |
| 2,096,020 | Adair et al. | Oct. 19, 1937 |
| 2,138,668 | Stewart | Nov. 29, 1938 |
| 2,193,868 | Geiger | Mar. 19, 1940 |
| 2,294,149 | Kline et al. | Aug. 25, 1942 |
| 2,333,463 | Bryce | Nov. 2, 1943 |
| 2,371,415 | Tolson | Mar. 13, 1945 |
| 2,436,829 | Roth | Mar. 2, 1948 |
| 2,439,446 | Begun | Apr. 13, 1948 |
| 2,440,992 | Webb | May 4, 1948 |
| 2,475,245 | Leaver et al. | July 5, 1949 |
| 2,485,539 | Weiss | Oct. 18, 1949 |
| 2,509,780 | O'Dea | May 30, 1950 |
| 2,521,946 | Rathje | Sept. 12, 1950 |
| 2,530,516 | Finch | Nov. 21, 1950 |
| 2,537,770 | Livingston et al. | Jan. 9, 1951 |
| 2,540,654 | Cohen et al. | Feb. 6, 1951 |
| 2,579,831 | Keinath | Dec. 25, 1951 |
| 2,583,983 | Arndt, Jr. et al. | Jan. 29, 1952 |
| 2,590,091 | Devol | Mar. 25, 1952 |